US009764325B2

(12) United States Patent
Davidowitz

(10) Patent No.: US 9,764,325 B2
(45) Date of Patent: Sep. 19, 2017

(54) GUIDED RETRIEVAL FOR RFID-TRACKED BIOLOGICAL AND OTHER SAMPLES

(71) Applicant: BioTillion, LLC, Skillman, NJ (US)

(72) Inventor: Hananel Davidowitz, Skillman, NJ (US)

(73) Assignee: BioTillion, LLC, Skillman, NJ (US)

( * ) Notice: Subject to any disclaimer, the term of this patent is extended or adjusted under 35 U.S.C. 154(b) by 22 days.

(21) Appl. No.: 14/462,618

(22) Filed: Aug. 19, 2014

(65) Prior Publication Data

US 2014/0352456 A1 Dec. 4, 2014

Related U.S. Application Data

(63) Continuation of application No. 13/026,359, filed on Feb. 14, 2011, now Pat. No. 8,872,627.

(Continued)

(51) Int. Cl.
*H04Q 5/22* (2006.01)
*B01L 3/00* (2006.01)

(52) U.S. Cl.
CPC .............. *B01L 3/545* (2013.01); *B01L 3/508* (2013.01); *B01L 2300/022* (2013.01)

(58) Field of Classification Search
CPC ..... B01L 3/545; B01L 3/508; B01L 2300/022

(Continued)

(56) References Cited

U.S. PATENT DOCUMENTS 2,975,496 A 3/1961 McGraw
3,896,958 A 7/1975 Robbins et al.

(Continued)

FOREIGN PATENT DOCUMENTS

DE 201 21 738 U1 10/2003
WO WO2004102330 A2 5/2004

OTHER PUBLICATIONS

Notice of Allowance; Mailed Dec. 21, 2012 for corresponding U.S. Appl. No. 12/787,729.

(Continued)

*Primary Examiner* — Amine Benlagsir
*Assistant Examiner* — Royit Yu
(74) *Attorney, Agent, or Firm* — Mendelsohn Dunleavy, P.C.; Steve Mendelsohn

(57) ABSTRACT

A storage system for storing samples, such as frozen biological samples in RFID-tagged vials. The storage system has a plurality of lowest-level containers, such as sample boxes; a plurality of mid-level containers, such as shelves and racks; and a highest-level container, such as a mechanical freezer. Each lowest-level container receives a plurality of samples in a corresponding plurality of storage locations, each mid-level container receives two or more lowest-level containers, and the highest-level container receives the two or more mid-level containers. Each mid-level container and each lowest-level container has a corresponding indicator device. A controller sub-system tracks the locations of samples stored in the storage system. When a desired sample is to be retrieved from the storage system, the controller sub-system activates (a) the indicator device corresponding to the mid-level container containing the desired sample and (b) the indicator device corresponding to the lowest-level container containing the desired sample.

20 Claims, 9 Drawing Sheets

Related U.S. Application Data

(60) Provisional application No. 61/304,392, filed on Feb. 12, 2010, provisional application No. 61/304,481, filed on Feb. 14, 2010.

(58) Field of Classification Search
USPC ................................................ 340/10.1–10.6
See application file for complete search history.

(56) References Cited

U.S. PATENT DOCUMENTS 5,287,414 A * 2/1994 Foster ................ G06K 7/10079 235/383
5,533,970 A 7/1996 Berger et al.
5,565,858 A 10/1996 Guthrie
5,721,531 A * 2/1998 Garver ................ B42F 15/0094 235/385
5,777,303 A 7/1998 Berney
6,084,515 A 7/2000 Maitin et al.
6,405,102 B1 6/2002 Swartz et al.
6,549,135 B2 4/2003 Singh et al.
6,652,812 B1 11/2003 Vartiainen et al.
6,658,218 B2 * 12/2003 Krolczyk ............... B65H 43/00 399/16
6,791,432 B2 9/2004 Smith et al.
6,829,520 B1 12/2004 Green
6,831,552 B2 12/2004 Lin
6,956,538 B2 * 10/2005 Moore ............... G06K 7/10336 340/572.4
7,070,053 B1 * 7/2006 Abrams ................ B01L 3/5453 206/459.5
7,079,044 B1 * 7/2006 Stanfield ........... G06F 17/30011 340/539.13
7,091,864 B2 8/2006 Veitch et al.
7,327,266 B2 2/2008 Watanabe et al.
7,646,354 B2 1/2010 Martin et al.
7,661,591 B2 2/2010 Dearing et al.
7,930,066 B2 4/2011 Eliuk et al.
8,035,485 B2 10/2011 Fritchie
8,049,626 B2 11/2011 Sakama et al.
8,115,599 B2 2/2012 Harazin et al.
8,314,740 B2 11/2012 Blumberg, Jr.
8,378,827 B2 2/2013 Davidowitz et al.
8,438,951 B1 5/2013 McCabe et al.
8,550,273 B2 10/2013 Levin et al.
8,872,627 B2 10/2014 Davidowitz
2002/0023441 A1 2/2002 Bara et al.
2005/0060062 A1 3/2005 Walker et al.
2005/0069861 A1 3/2005 Zimmermann et al.
2005/0205673 A1 * 9/2005 Morris ............... G06K 7/10366 235/385
2006/0215495 A1 * 9/2006 Soled .................... A61J 7/0481 368/10
2007/0109130 A1 5/2007 Edenfield
2007/0171075 A1 7/2007 Ryu
2007/0296599 A1 12/2007 Wang et al.
2008/0106388 A1 5/2008 Knight
2008/0131629 A1 6/2008 Chisholm et al.
2008/0149584 A1 6/2008 Martinelli
2008/0164210 A1 * 7/2008 DeMarco .................. B01L 9/06 210/656
2008/0186147 A1 8/2008 Carmeli
2008/0188980 A1 * 8/2008 Home ..................... G07F 17/12 700/244
2008/0231157 A1 9/2008 Lowe
2009/0242446 A1 10/2009 Abbott et al.
2009/0306620 A1 12/2009 Thilly et al.
2010/0102967 A1 4/2010 Lee et al.
2011/0100862 A1 * 5/2011 Turkington ............. A61J 1/035 206/531
2011/0127273 A1 * 6/2011 Deane ....................... A61J 1/00 220/592.2

OTHER PUBLICATIONS

Lindsay, J. D., et al., "Cascading RFID Tags," IP.com Prior Art Database, Dec. 23, 2003, Retrieved from the Internat: <URL: www.ip.com> [retrieved on Jan. 18, 2007].
Non-Final Office Action; Mailed Mar. 20, 2013 for the related U.S. Appl. No. 13/026,359.
Final Office Action; Mailed Sep. 10, 2013 for the related U.S. Appl. No. 13/026,359.
Non-Final Office Action; Mailed Feb. 5, 2014 for the related U.S. Appl. No. 13/026,359.
Notice of Allowance; Mailed Aug. 28, 2014 for related U.S. Appl. No. 13/026,359.

* cited by examiner

GUIDED RETRIEVAL FOR RFID-TRACKED BIOLOGICAL AND OTHER SAMPLES

CROSS-REFERENCE TO RELATED APPLICATIONS

This application is a continuation of co-pending U.S. application Ser. No. 13/026,359, filed on Feb. 14, 2011, which application claims the benefit of the filing dates of U.S. provisional application No. 61/304,392, filed on Feb. 12, 2010, and U.S. provisional application No. 61/304,481, filed on Feb. 14, 2010, the teachings of both of which are incorporated herein by reference in their entirety.

The subject matter of this application is related to the subject matter of U.S. patent application Ser. No. 12/064,748 ("the '748 application"), filed on Feb. 25, 2008, and U.S. patent application Ser. No. 12/787,729 ("the '729 application"), filed on May 26, 2010, the teachings of both of which are incorporated herein by reference.

STATEMENT REGARDING FEDERALLY SPONSORED RESEARCH OR DEVELOPMENT

The Government of the United States of America has rights in this invention pursuant to National Institutes of Health (NIH) Grant Nos. 1R43RR024787-01 and 3R43RR024787-01S1 awarded by the U.S. Department of Health and Human Services.

BACKGROUND

Field of the Invention

The present invention relates to RFID tags and, more specifically but not exclusively, to using RFID tags to identify and track samples, such as biological samples stored in freezers.

Description of the Related Art

This section introduces aspects that may help facilitate a better understanding of the invention. Accordingly, the statements of this section are to be read in this light and are not to be understood as admissions about what is prior art or what is not prior art.

Biological samples are often stored in vials that are marked with and/or have labels containing bar codes and/or printed or handwritten text and/or numbers that identify the particular biological sample contained within the vial. In order to preserve the biological material, such vials are often stored in freezers containing many hundreds or even thousands of different vials. Over time, labels tend to fade and peal off from the vials, making identification of the stored samples difficult or even impossible. Even when the labels remain intact and legible, when the vials are removed from the freezer, reading the labels is often hampered by ice and frost.

Technology is being developed to use RFID (radio frequency identification) tags to identify and track biological samples stored in freezers, where each vial has its own RFID tag having a unique RFID number associated with it. Here we define RFID tag to include the RFID chip, the antenna, and a substrate used to hold everything in place. The '748 and '729 applications describe some of this technology.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIGS. 2(B1) and 2(B2) through 2(F1) and 2(F2) show similar views of tagged vials and RFID tags, respectively, according to five other techniques for permanently affixing RFID tags to previously untagged vials;

FIG. 3(B1) shows a cross-sectional side view of tagged vial having a vented cavity, and FIG. 3(B2) shows a magnified, cross-sectional side view of the bottom of the tagged vial of FIG. 3(B1);

DETAILED DESCRIPTION

Affixing RFID Tags to Vials

FIGS. 10-13 of the '748 application illustrate different techniques for affixing RFID tags to vials. Each of these techniques involved inserting an existing vial into a tagged tube having an RFID tag hermetically sealed within a bottom compartment of the tagged tube. One problem with these techniques is that the diameter and height of the resulting vial/tube assembly are larger than those of the vial alone. As a result, the vial/tube assembly might not fit within standard storage boxes, centrifuges, and other lab equipment and might force the use of lower-density boxes (i.e., boxes capable of storing fewer vials per unit area).

Techniques have now been developed for affixing RFID tags to vials without increasing the diameter and/or height of the resulting tagged vials as compared to the original, untagged vials. Some of these techniques can be applied to conventional vials, including conventional vials that already contain biological samples. As such, these techniques can be used to retrofit existing vials with RFID tags. Other techniques involve specially designed vials, which might not yet exist. Although such vials might not yet exist, once they are manufactured, the RFID tags can be affixed to the vials either before or after biological samples are stored in the vials.

Figure 1:
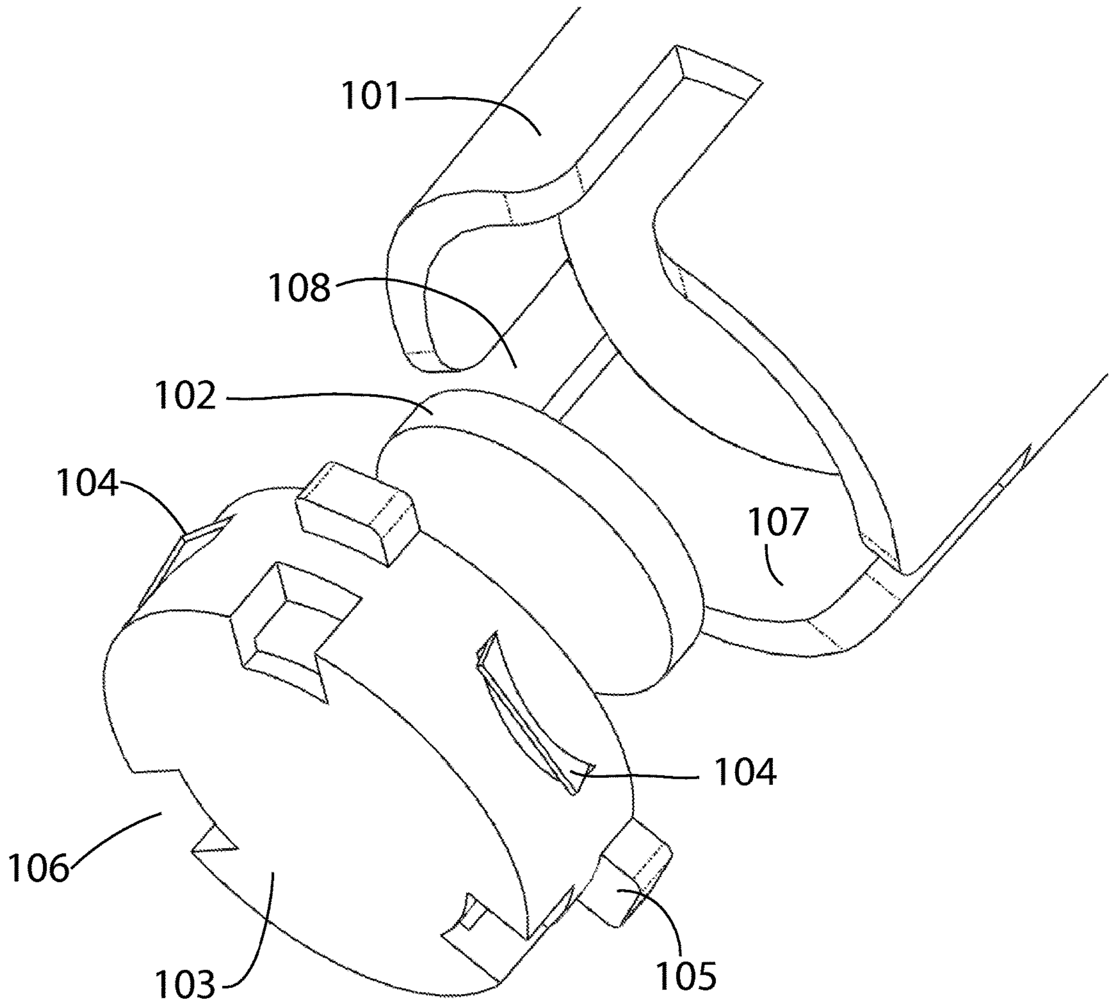
FIG. 1 illustrates, in an exploded, 3D perspective view, one technique for permanently affixing an RFID tag to a previously untagged vial.

FIG. 1 illustrates, in an exploded, 3D perspective view, one technique for permanently affixing an RFID tag 102 to a previously untagged vial 101. In particular, RFID tag 102 is inserted into a recess 107 located at the bottom of vial 101. A retainer 103 (a.k.a. plug or cap) is then inserted into the recess to retain the RFID tag in place, resulting in a tagged vial. As shown in FIG. 1, retainer 103 has (e.g., three) rigid (e.g., metal), angled tabs 104 that engage (e.g., gouge into) the relatively soft (e.g., plastic) material of the vial after the retainer is inserted into recess 107, thereby preventing retainer 103 and RFID tag 102 from being easily removed from the vial. In addition, retainer 103 has (e.g., three) protrusions 105 that fit within (e.g., three) corresponding grooves 108 at the bottom of vial 101 to ensure that tabs 104 (and therefore RFID tag 102) are properly aligned within recess 107. Insert 103 also has (e.g., three) openings 106 (a.k.a. vents) that allow liquid nitrogen (used to keep the biological samples cold) to drain from the tagged vial in order to prevent violent decompression that might otherwise occur as the liquid nitrogen warms up.

Grooves 108 are used to grab the bottom of the vial during robotic handling and one-handed removal of the cap where the vial is inserted into a socket that meshes with these grooves. Even though the bottom of the vial has been filled with a tag and a retainer, the geometry of the grooves is preserved due to openings 106.

Note that, when RFID tag 102 is affixed to vial 101 after a biological sample has already been stored within the vial, the sterility of the stored biological sample remains intact. This technique allows untagged vials to be sterilized using gamma radiation and/or e-beam radiation, which can destroy RFID tags. After biological samples have been placed and hermetically sealed within the sterilized vials, the RFID tags can then be affixed using the technique of FIG. 1 without jeopardizing the sterility of the stored samples. Note that the sterility of the exterior of the vial is often not an issue so long as the biological sample is appropriately sealed within the sterile interior of the vial.

When other sterilization techniques are employed (e.g., exposure to ethylene oxide gas or autoclaving, using lower doses of radiation, orienting the radiation away from the RFID tag, or otherwise shielding the RFID tag from the radiation), it may be possible to sterilize the RFID tag as well before affixing it to the vial.

Figure 2:
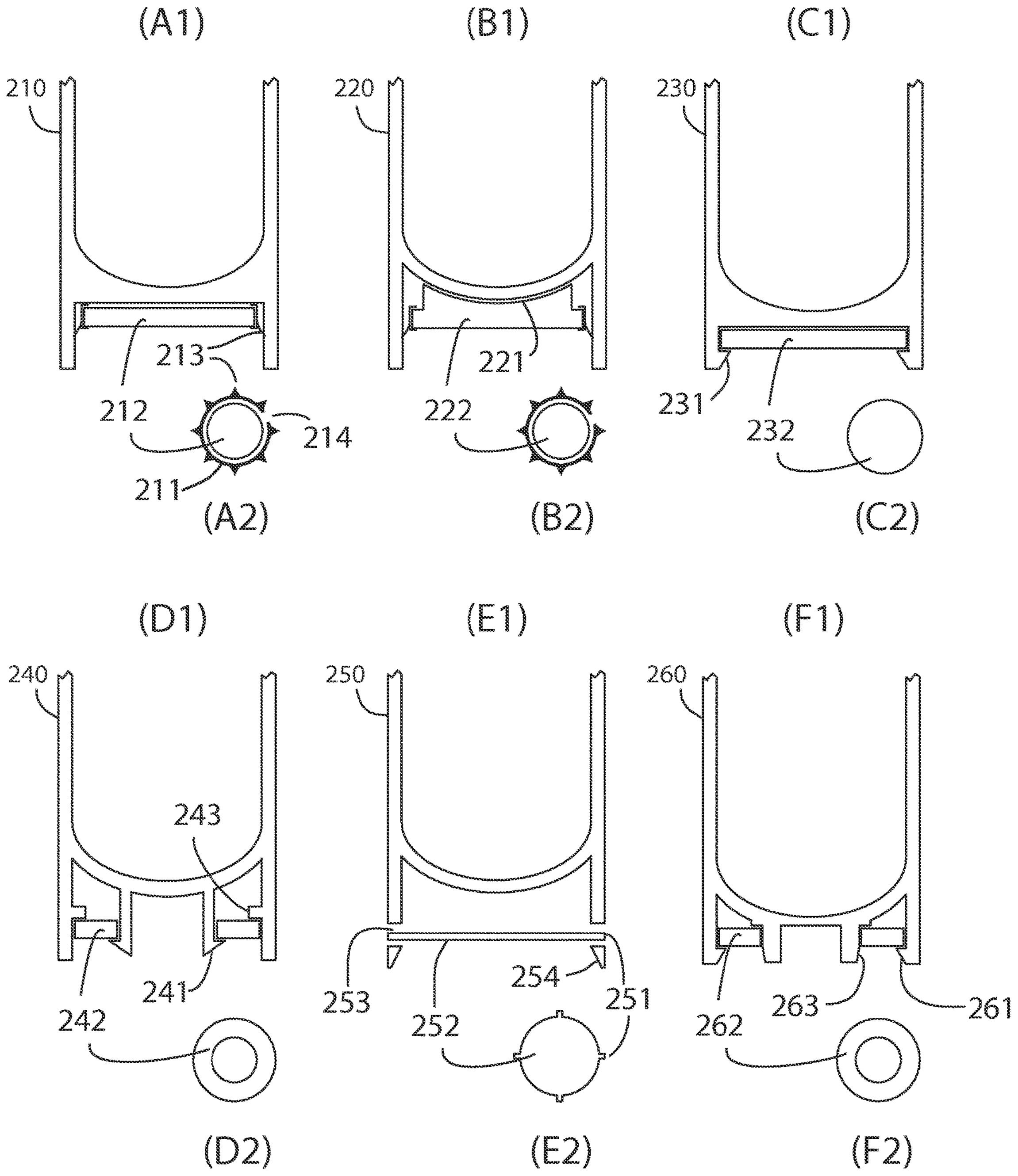
FIG. 2(A1) shows a cross-sectional side view of the bottom of a tagged vial according to another technique for permanently affixing an RFID tag to a previously untagged vial, while FIG. 2(A2) shows a plan view of the RFID tag of FIG. 2(A1)

FIG. 2(A1) shows a cross-sectional side view of the bottom of a tagged vial 210 according to another, similarly suitable technique for permanently affixing an RFID tag 212 to a previously untagged vial, while FIG. 2(A2) shows a plan view of RFID tag 212. FIGS. 2(B1) and 2(B2) through FIGS. 2(F1) and 2(F2) show similar views of tagged vials and RFID tags, respectively, according to five other, similarly suitable techniques for permanently affixing RFID tags to previously untagged vials.

Vials 210 and 220 of FIGS. 2(A1) and 2(B1), respectively, are conventional vials that are not necessarily manufactured in any special way to accommodate RFID tags 212 and 222. On the other hand, vials 230-260 of FIGS. 2(C1)-2(F1), respectively, do have structure specifically designed to accommodate the corresponding RFID tags 232-262.

Referring to FIGS. 2(A1) and 2(A2), a spring 211 is attached to RFID tag 212, and the resulting tag/spring assembly is press-fit into the recess at the bottom of vial 210. The tag is oriented properly within the recess as a result of the abutting of the flat, top surface of the tag with the flat, bottom surface of the vial. Spring 211 has pointed, rigid (e.g., metal), angled tabs 213 that keep the tag in place by engaging the relatively soft vial material. If spring 211 is made of a conducting metal, then a gap 214 in the spring will prevent loss of RFID signal due to current that could otherwise be induced in the closed loop formed by a spring without such a gap.

The technique illustrated in FIGS. 2(B1) and 2(B2) is very similar to that of FIGS. 2(A1) and 2(A2). In this technique, however, RFID tag 222 is oriented properly within the recess as a result of the abutting of the curved, top surface 221 of the tag with the curved, bottom surface of vial 220.

Referring to FIGS. 2(C1) and 2(C2), the bottom of vial 230 has a number (e.g., at least three) of flexible (e.g., plastic), outer clips 231 (or a single, flexible, ring-shaped clip) that allow a disk-shaped (or washer-shaped) RFID tag 232 to be inserted into and then permanently retained within the recess at the bottom of the vial. Here, too, abutting of the flat (alternatively, curved), top surface of the tag with the flat (alternatively, curved), bottom surface of the vial ensures proper orientation of the tag within the vial recess.

Referring to FIGS. 2(D1) and 2(D2), the bottom of vial 240 has a number (e.g., at least three) of flexible (e.g., plastic), inner clips 241 (or a single, flexible, ring-shaped, inner clip) and a number of outer stops 243 (or a single, ring-shaped, outer stop) that allow a washer-shaped RFID tag 242 to be inserted into and then permanently retained within the recess at the bottom of the vial. Here, too, abutting of the flat, top surface of the tag with the flat, bottom surfaces of the stops ensures proper orientation of the tag within the vial recess.

Referring to FIGS. 2(E1) and 2(E2), the cylindrical recess side wall at the bottom of vial 250 has (e.g., four) holes 253 that receive (e.g., four) corresponding tabs 251 that protrude from the outer, cylindrical edge of disk-shaped (or washer-shaped) RFID tag 252. Beveled edges 254 on the flexible recess side wall assist during the insertion of the tag into the vial recess. Here, the positioning of tabs 251 into holes 253 ensures proper orientation of the tag within the vial recess.

The technique illustrated in FIGS. 2(F1) and 2(F2) is very similar to that of FIGS. 2(D1) and 2(D2). In this technique, however, vial 260 has outer clips 261, similar to outer clips 231 of FIG. 2(C1), instead of inner clips, and inner guides 263, instead of outer stops. Here, abutting of the flat, top surface of the tag with the flat, top surfaces of the guides ensures proper orientation of the tag within the vial recess.

Note that all of the techniques illustrated in FIGS. 1 and 2 enable permanent attachment of RFID tags to sterile vials, where, in typical applications, the term "permanent" implies that the RFID tags will stay in place during the g forces encountered during centrifugation. In addition, all of these techniques result in tagged vials having the same diameter and the same height as the corresponding untagged vials.

Although not necessarily illustrated in these figures, it is contemplated that the vials associated with some or all of these different techniques enable conventional methods for removing and replacing the caps at the tops of the vials. These methods usually involve teeth or slots at the bottom of the vials that engage complementary slots or teeth in a desktop receptacle that allows the user to twist the cap off or onto a received vial with one hand. The vials may also have other vial characteristics such as seals, indentations for single-hand and/or robotic manipulation, etc., that conform with and enable conventional laboratory practices.

Although the embodiments of FIG. 2 were described in the context of labels 212-262 identifying RFID tags, it should be understood that those figures would also apply to techniques in which the elements labeled 212-262 are retainers analogous to retainer 103 of FIG. 1 that hold in place RFID tags analogous to RFID tag 102 of FIG. 1. Note that the RFID tag and/or the retainer might need to be modified from the configurations shown in FIG. 2 depending on the characteristics of the embodiment. For example, in FIGS. 2(D) and 2(F), both the RFID tag and the retainer would need to be washer shaped. In FIG. 2(B), the top surface of the RFID tag, and perhaps not the top surface of the retainer, would have the curved shape to abut the curved, bottom surface of the vial.

Although FIGS. 1 and 2 illustrate seven different techniques for affixing RFID tags to vials, those skilled in the art will appreciate that the same result can be achieved using different designs and configurations of vials and tags. Note that some of these other techniques might not retain the same diameter and/or the same height as the untagged vial. In addition, some of these techniques may allow selective removal of an RFID tag from a previously tagged vial.

Note that, when an untagged vial has no recess, an RFID tag can be affixed to (e.g., the bottom of) the vial (i) using a suitable adhesive, such as a hot-melt adhesive, or (ii) by partially melting the (e.g., plastic) vial material to accommodate the tag.

Venting Tagged Vials

Figure 3:
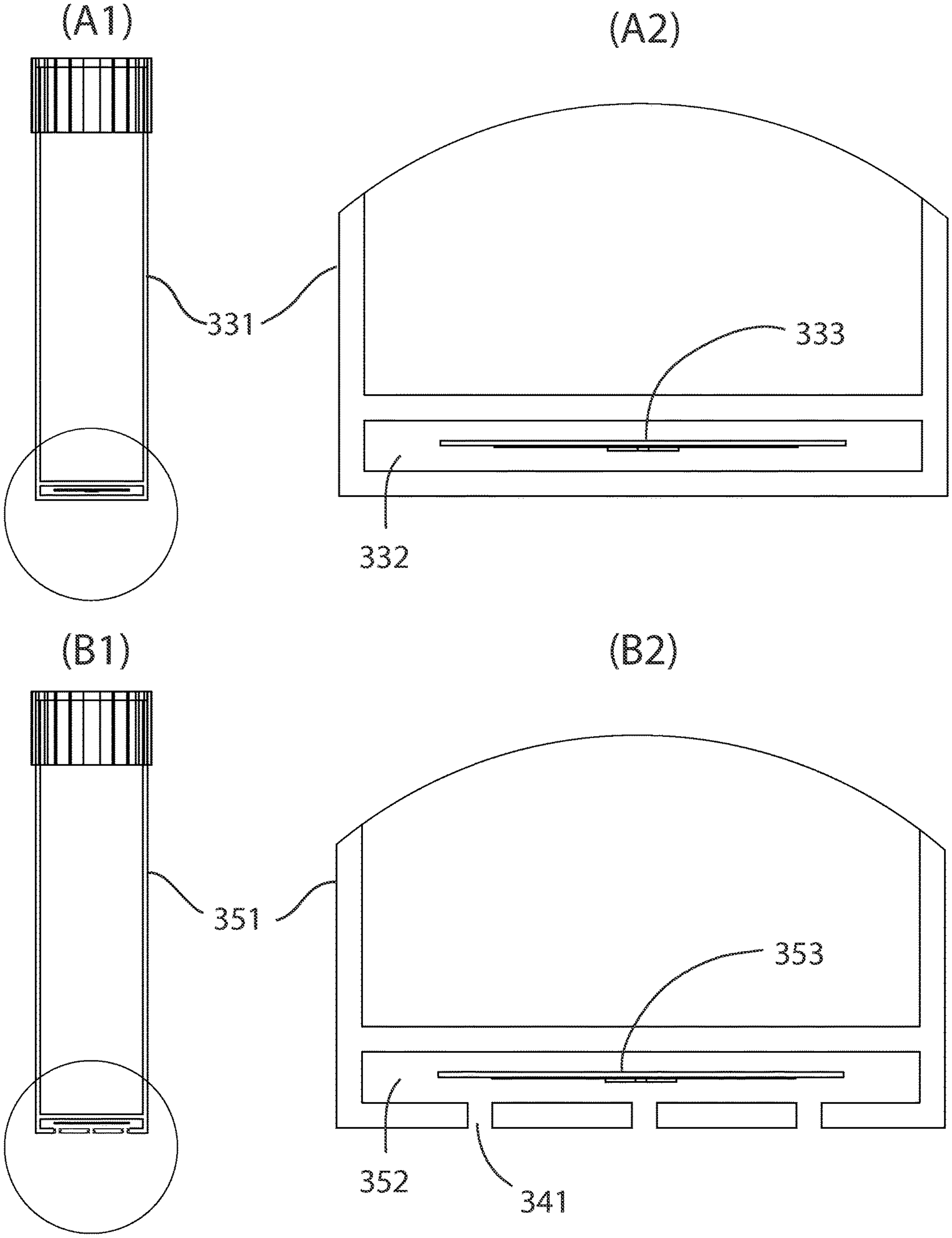
FIG. 3(A1) shows a cross-sectional side view of a tagged vial having an unvented cavity, and FIG. 3(A2) shows a magnified, cross-sectional side view of the bottom of the tagged vial of FIG. 3(A1)

FIG. 3(A1) shows a cross-sectional side view of tagged vial 331, and FIG. 3(A2) shows a magnified, cross-sectional side view of the bottom of tagged vial 331. The bottom of the tagged vial has an enclosed cavity 332 that can be used to hold an RFID tag and/or a label containing a 2D bar code, text, and/or numbers, collectively labeled 333. Such a tagged vial can trap liquid nitrogen within the enclosed cavity as a result of cracks or pinhole defects in the (plastic) vial material that are formed during manufacture or during repeated freeze/thaw cycles. When such vials are removed from cold storage and brought to room temperature, the trapped liquid nitrogen evaporates into gas. If the gas cannot escape quickly enough from the enclosed cavity, high pressures can build up, possibly resulting in violent decompression of the trapped gas and any remaining liquid, resulting in sample loss and possible injury.

As described previously, retainer 103 of FIG. 1 has one or more holes 106 that allow venting of liquid nitrogen trapped within the recess of tagged vial 101. An analogous technique can be employed in the case of a vial having an enclosed cavity, such as that shown in FIG. 3.

FIG. 3(B1) shows a cross-sectional side view of tagged vial 351, and FIG. 3(B2) shows a magnified, cross-sectional side view of the bottom of tagged vial 351. Tagged vial 351 is identical to tagged vial 331 of FIG. 3(A), except that there are one or more vent holes 341 at the bottom (and/or at the side) of cavity 352 that allow liquid nitrogen to drain from the cavity as the vial is removed from the freezer. The holes also vent nitrogen gas as the liquid evaporates, thereby preventing pressure build-up and the concomitant violent decompression.

Note that venting holes can also be incorporated into the design of the tagged tubes shown in FIGS. 10-13 of the '748 application.

Wireless Power/Data Transfer in a Liquid Nitrogen Dewar

RFID-tagged vials containing biological samples can be stored in ultra-low-temperature biological repositories, such as liquid nitrogen dewars and mechanical freezers. For example, in a dewar, multiple tagged vials are stored in each of multiple boxes, multiple such boxes are stored in each of multiple racks that are housed within the dewar. In a mechanical freezer, multiple such boxes can be stored in each of multiple shelves within the freezer. In designing such cold storage systems, one challenge is getting electrical power and downlink data to the RFID tags and reading uplink data from the RFID tags.

Figure 4:
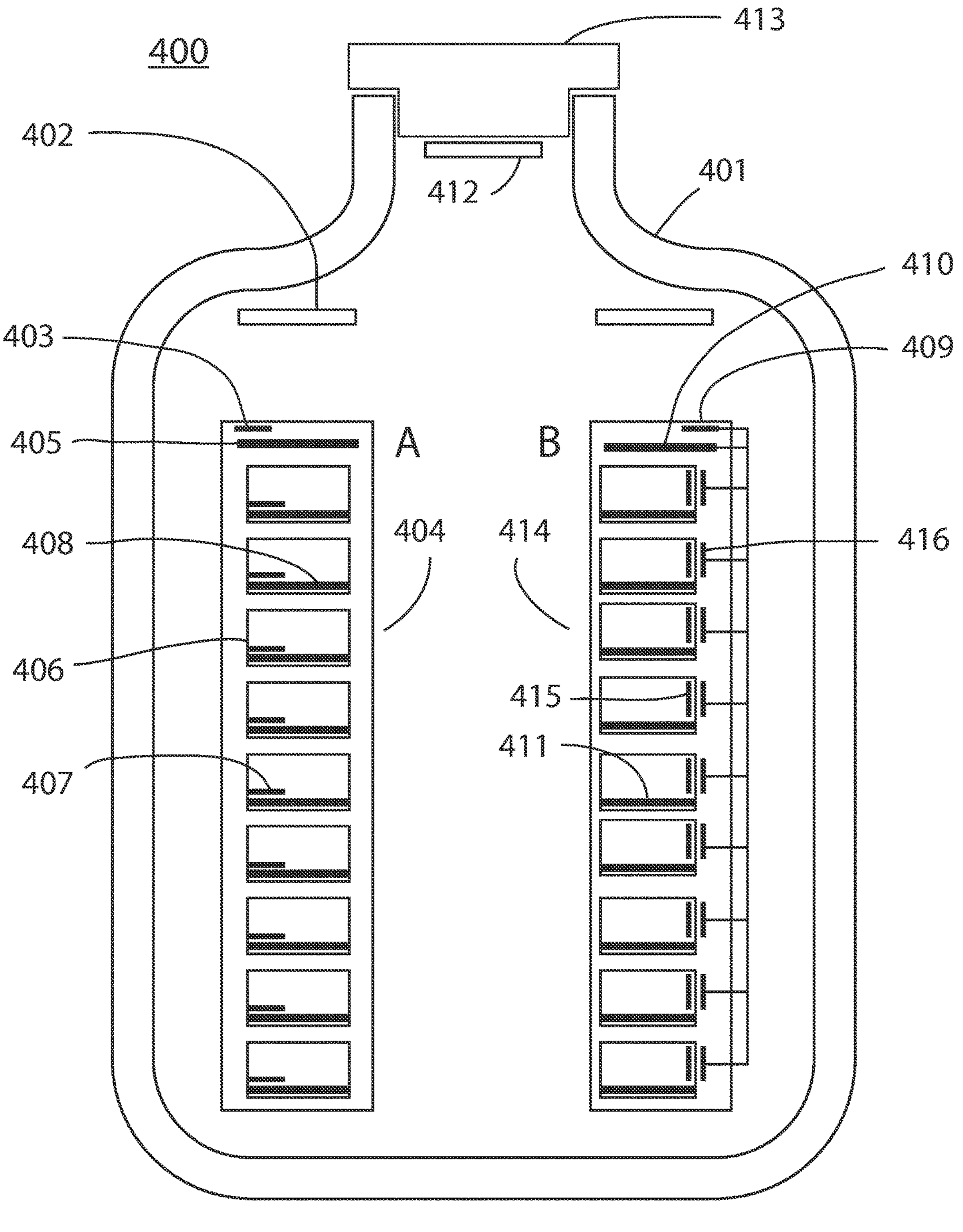
FIG. 4 shows a cross-sectional side view of a liquid nitrogen dewar.

FIG. 4 shows a cross-sectional side view of a liquid nitrogen dewar 400 that uses wireless coupling to transfer electrical power and/or downlink data to and uplink data from different sets of electronics that are themselves responsible for interacting with the RFID tags of tagged vials stored within the dewar.

FIG. 4 shows two different power coils 402 and 412 (e.g., annular antennas) configured within dewar 400. Depending on the particular implementation, dewar 400 may have only one of these two power coils or both. Although not explicitly shown in FIG. 4, each coil is powered via cabling that is, for example, threaded through a hole in dewar lid 413 or through the interface between the lid and the dewar body 401. The following description assumes that dewar 400 has power coil 402, but not power coil 412, although analogous teachings would apply to the other two possible implementations of dewar 400.

As illustrated in FIG. 4, dewar 400 stores two different types of racks: type A and type B. In rack type A, rack 404 has rack circuit 403, and each box 406 stored in the rack has a box circuit 407. Associated with rack circuit 403 is rack electronics 405, and associated with each box circuit 407 is a different set of box electronics 408. Although not explicitly shown in FIG. 4, each circuit is hard-wired to its corresponding set of electronics.

In operation, AC electrical power from outside dewar 400 is provided to power coil 402 via the previously described (but not illustrated) cabling through or adjacent to plug 413. The frequency of the AC electrical power is selected such that electromagnetic radiation generated by power coil 402 is wirelessly received by rack circuit 403 and box circuits 407. The electrical power induced in these circuits is then transferred via hard-wiring to provide operating power to the corresponding sets of electronics.

In rack type B, rack 414 has rack circuit 409, which is connected via hard-wiring to rack electronics 410 and to rack coils 416 on the rack side. Inductively coupled to each rack coil 416 is a corresponding box coil 415 in each box, which is, in turn, connected via hard-wiring (not shown) to a corresponding set of box electronics 411. In this case, the electromagnetic radiation generated by power coil 402 is wirelessly received by rack circuit 409, and the electrical power induced in that circuit is then distributed to all of the different sets of electronics.

Other types of racks are also possible having different configurations of wireless and wired power and data transfer.

Independent of the rack type, the power transfer and data signaling between each set of box electronics and the corresponding individual RFID tags in the stored vials are achieved by inductive coupling of closely positioned coils as described in the '748 and '729 applications.

In a similar manner that electrical power can be transferred from outside of dewar 400 to the different sets of electronics via power coil 402 and the various circuits so too can downlink data be transfer along that same path using standard AM and/or FM or any other communication technique. In addition, in a reciprocal manner, uplink data can be transferred from the various sets of electronics to outside of dewar 400 via the various circuits and power coil 402 using similar communication techniques.

To locate a particular tagged vial stored within dewar 400, its physical address can be reported to the outside world. In this case, one or all of the tagged vials can be queried either simultaneously or sequentially in groups of one or more vials by the different sets of rack and box electronics until the desired vial is located. The location of that vial within its box would then be reported to the corresponding set of box electronics, which would then report that intra-box information along with the identity of the box to the corresponding rack electronics, which would then report the intra-box information, the box identity, and the identity of the rack to the outside world. With this information, a user could remove the identified rack from dewar 400, remove the identified box from that rack, and then remove the tagged vial from the identified location within that box.

Depending on the particular implementation, the different sets of electronics can be powered and activated either simultaneously or sequentially by assigning different sets of electronics to different non-overlapping time slots, where the particular time slot for a given set of electronics can be assigned as a function of the physical location of the electronics. For example, the time slot for the box at the top of rack 404 would be based on the rack position of the box, not the particular box per se. As such, if that box were swapped with another box in another position, then their time slots would also be swapped. Analogous allocation and swapping of time slots may also be applied to different racks located at different positions within dewar 400.

Other methods of collision mitigation can be used as well.

For freezers, power coils analogous to power coils 402 and/or 412 can be installed inside a freezer and powered via cabling to the outside world with analogous circuits configured to the shelves and boxes within the freezer to achieve wireless power and/or data transfer between those power coils and circuits that provide operating power and data to and from different sets of shelf and box electronics.

The frequency of the transmitted electromagnetic radiation used to transfer power would typically be in the range of about 1 MHz to about 10 MHz, which has a wavelength of about 30 m to about 300 m, which is much bigger than typical dewars and freezers. This enables dewars and freezers to be designed to have few if any "dead spots" (i.e., locations with intolerably small field strengths resulting from destructive interference) within their interiors. Since dewars and freezers are essentially very cold Faraday cages, any wireless signals escaping to the outside world would be relatively small, thereby making FCC compliance relatively easy.

Figure 5:
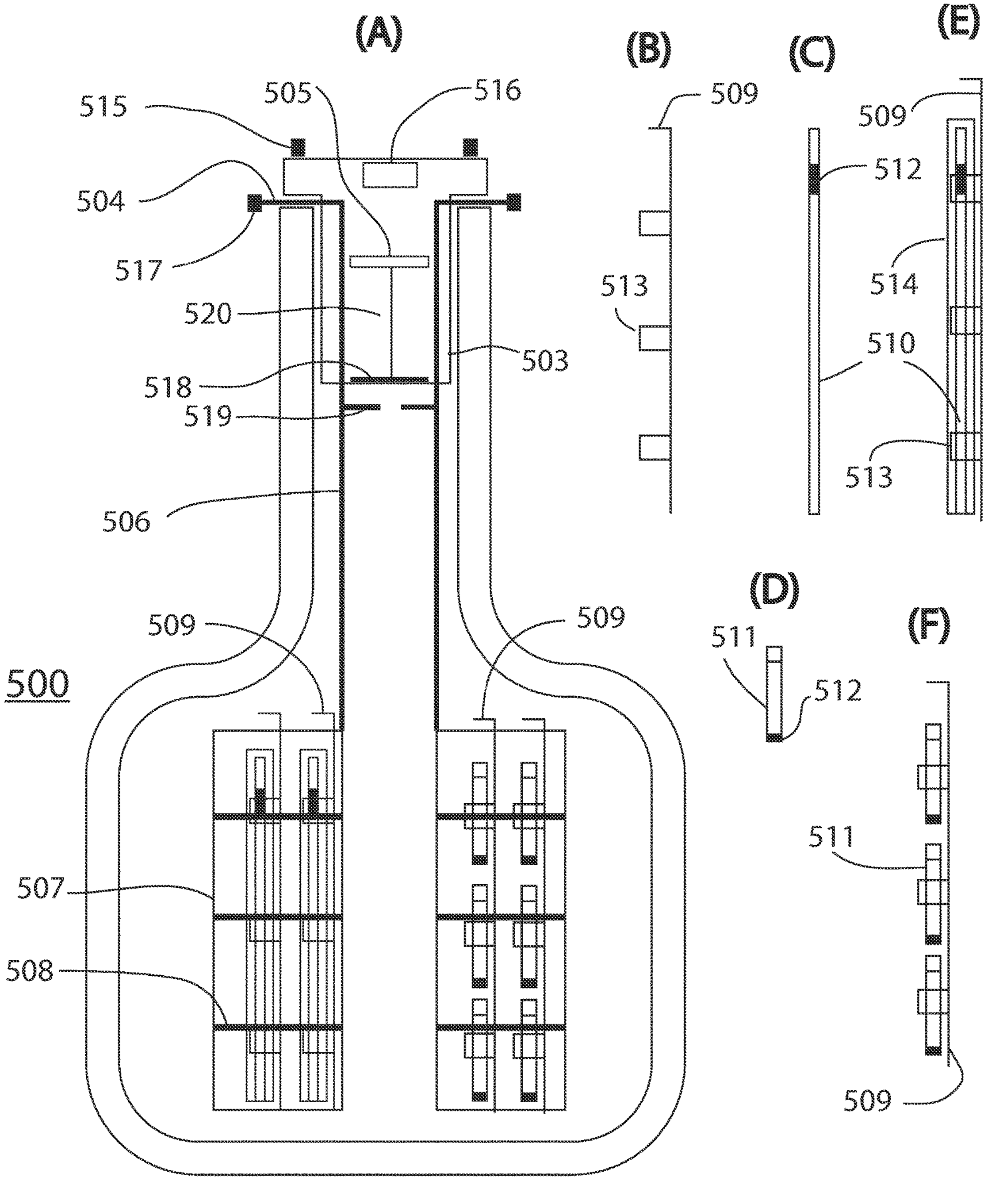
FIG. 5 shows cross-sectional side view of a transport dewar used for sample transport and its various components.

FIG. 5(A) shows a cross-sectional side view of a transport dewar—another (smaller) type of liquid nitrogen dewar 500—that may be used, for example, to transport samples of animal sperm to and from farms. As in the case of larger liquid nitrogen dewars, like dewar 400 of FIG. 4, and mechanical freezers, here, too, it is important to know the identity and location of samples within dewar 500.

As shown in FIG. 5(A), dewar 500 holds multiple canisters 507, each of which holds multiple canes 509 (see FIG. 5(B)) having clips 513 that can hold two different types of tagged containers: tagged straws 510 (see FIG. 5(C)) and tagged vials 511 (see FIG. 5(D)), each instance of both of which has a unique RFID tag 512. FIG. 5(E) shows a cane 509 holding a single goblet 514 containing multiple tagged straws 510, while FIG. 5(F) shows a cane 509 holding three tagged vials 511 (one per clip 513). Dewar 500 may also hold other suitable types of tagged containers (i.e., other than vials and straws).

Each canister 507 is connected by a suspending bar 506 to a corresponding handle 504 that extends outside of dewar 500 adjacent to a loose-fitting plug 503. Handle 504 enables the corresponding canister, along with its associated goblets, straws, and vials, to be removed from and then replaced back into dewar 500.

As shown in FIG. 5(A), each canister 507 has one or more RFID antennae 508 that can communicate with the RFID tags attached to the tagged containers stored in that canister. These antennae are controlled by a circuit 505 (e.g., located within plug 503) that can inventory the contents of the dewar as needed. Circuit 505 can be powered either from the outside world via external wiring (not shown) or by a battery 516 (e.g., also located within plug 503) that is connected to circuit 505 via internal wiring (not shown). Depending on the implementation, circuit 505 can communicate with an external computer, for example, via Ethernet or USB or wirelessly. The external computer can also be a handheld device, a smart phone, or any other suitable mobile computing device for use in the field. This device can, in turn, communicate with a central database and/or provide a graphical user interface to show the contents of the dewar and/or to illuminate an LED 515 located on dewar plug 503 and/or an LED 517 located on handle 504 to show the user which dewar and which canister holds a desired sample.

The power for reading the RFID tags can be adjusted so that antennae 508 in a particular canister 507 read only the RFID tags 512 in that canister. In any case, adjacent canisters will be well shielded from each other due to the canister's conductive metallic composition.

In one implementation, circuit 505 can connect to antennae 508 via connectors (not shown) attached to suspending bars 506, where the connectors automatically plug in when the corresponding handle is in place. In an alternative implementation, antennae 508 can be coupled inductively through an air core transformer in which a coil 518 in plug 503 is hard wired (520) to circuit 505 and wirelessly transmits and receives RFID signals to and from a coil 519 hardwired to each canister 507.

It should be noted that high power-transfer efficiency can be achieved when the transmitting and receiving circuit are in resonance. The resonance condition can greatly extend the distance at which power and data can be exchanged. Thus, all of the components in the system might be designed so that the transmitting/receiving pair would be operating under resonance conditions. In addition, different transmitter/receiver pairs can operate at different frequencies, for example, data and power circuits can use different frequencies.

Guided Retrieval System

Figure 6:
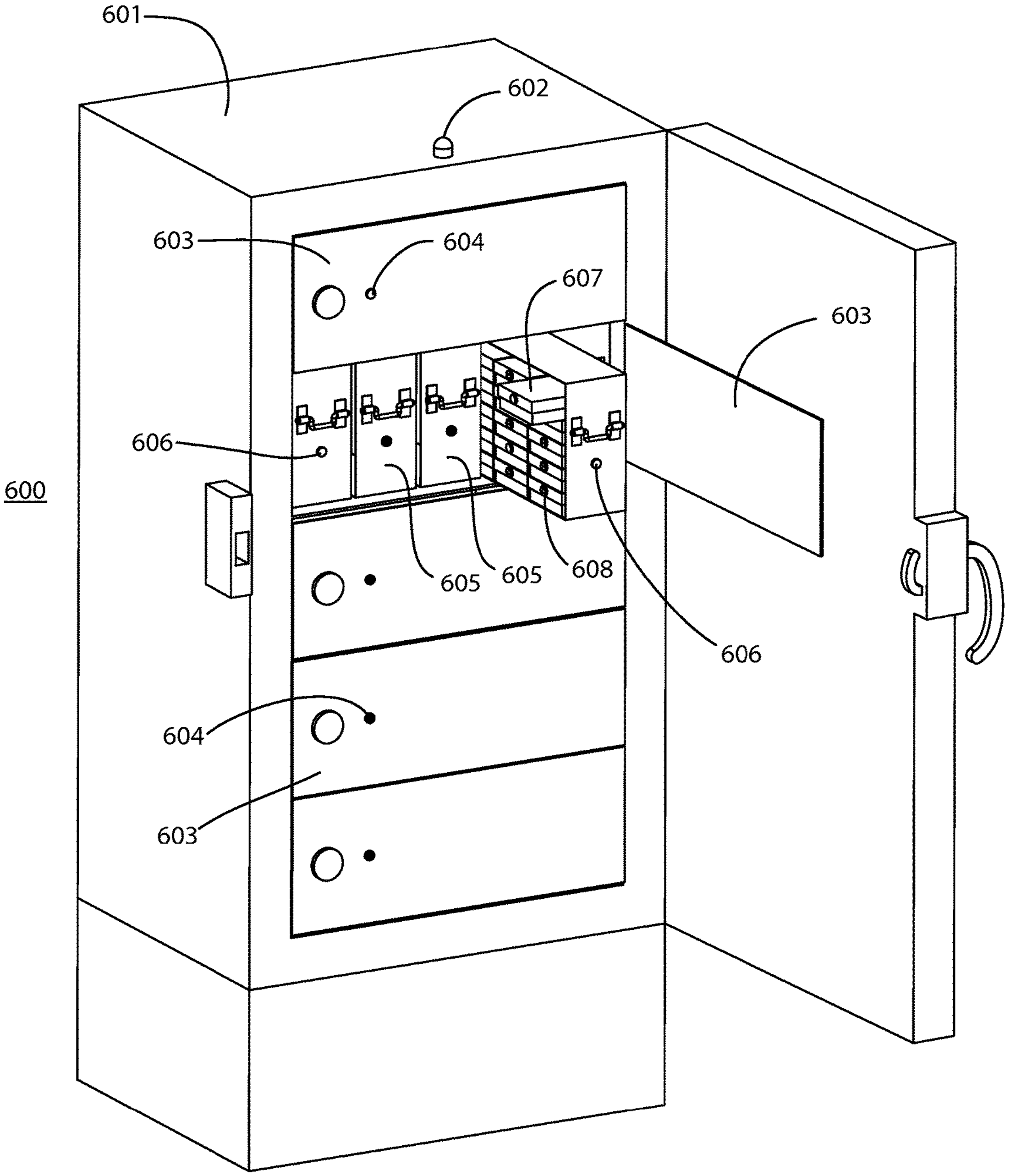
FIG. 6 shows a 3D perspective view of a mechanical freezer used to store tagged vials containing, e.g., biological samples.

FIG. 6 shows a 3D perspective view of a mechanical freezer 600 used to store tagged vials containing, e.g., biological samples. Mechanical freezer 600 may be only one of a number of different mechanical freezers and possibly other types of cold storage devices, such as liquid nitrogen dewars, or even room-temperature storage devices, such as formalin fixed paraffin embedded tissue block cabinets, that are located in a single facility.

As represented in FIG. 6, mechanical freezer 600 has (e.g., five) shelves, one behind each different vapor door 603, where each shelf has (e.g., five) racks 605. Each rack 605 contains a number of boxes 607, each of which stores a number of tagged vials (not shown). At the top 601 of freezer 600 is an (e.g., LED) freezer indicator light 602. In addition, each vapor door 603 has a corresponding (e.g., LED) shelf indicator light 604, each rack 605 has a corresponding (e.g., LED) rack indicator light 606, and each box 607 has a corresponding (e.g., LED) box indicator light 608.

Although not depicted in FIG. 6, freezer 600 has a hierarchical internal electronic configuration and is connected to an external computer in a manner analogous to that shown in FIGS. 1 and 5-9 of the '748 application. This external computer keeps track of the current locations of all of the samples stored in mechanical freezer 600 and in any other storage devices in the facility. When one or more samples are to be retrieved, the computer selectively illuminates appropriate indicator lights to guide a user to the tagged vials containing those samples.

For example, if only a single sample is to be retrieved from freezer 600, then the computer will illuminate freezer indicator light 602, the corresponding shelf indicator light 604, the corresponding rack indicator light 606, and the corresponding box indicator light 608 to guide the user to that particular box in which the tagged vial containing the desired sample is currently stored.

Depending on the particular implementation, the computer might not illuminate the corresponding shelf indicator light 604 until after the user opens the freezer's door. Similarly, the computer might not illuminate the corresponding rack indicator light 606 until after the user opens the corresponding vapor door 603, and the computer might not illuminate the corresponding box indicator light 608 until after the user partially removes the corresponding rack 605.

If more than one sample is to be retrieved from freezer 600, depending on the particular implementation, the computer may either illuminate all appropriate indicator lights simultaneously or sequentially as different samples are retrieved.

Figure 7:
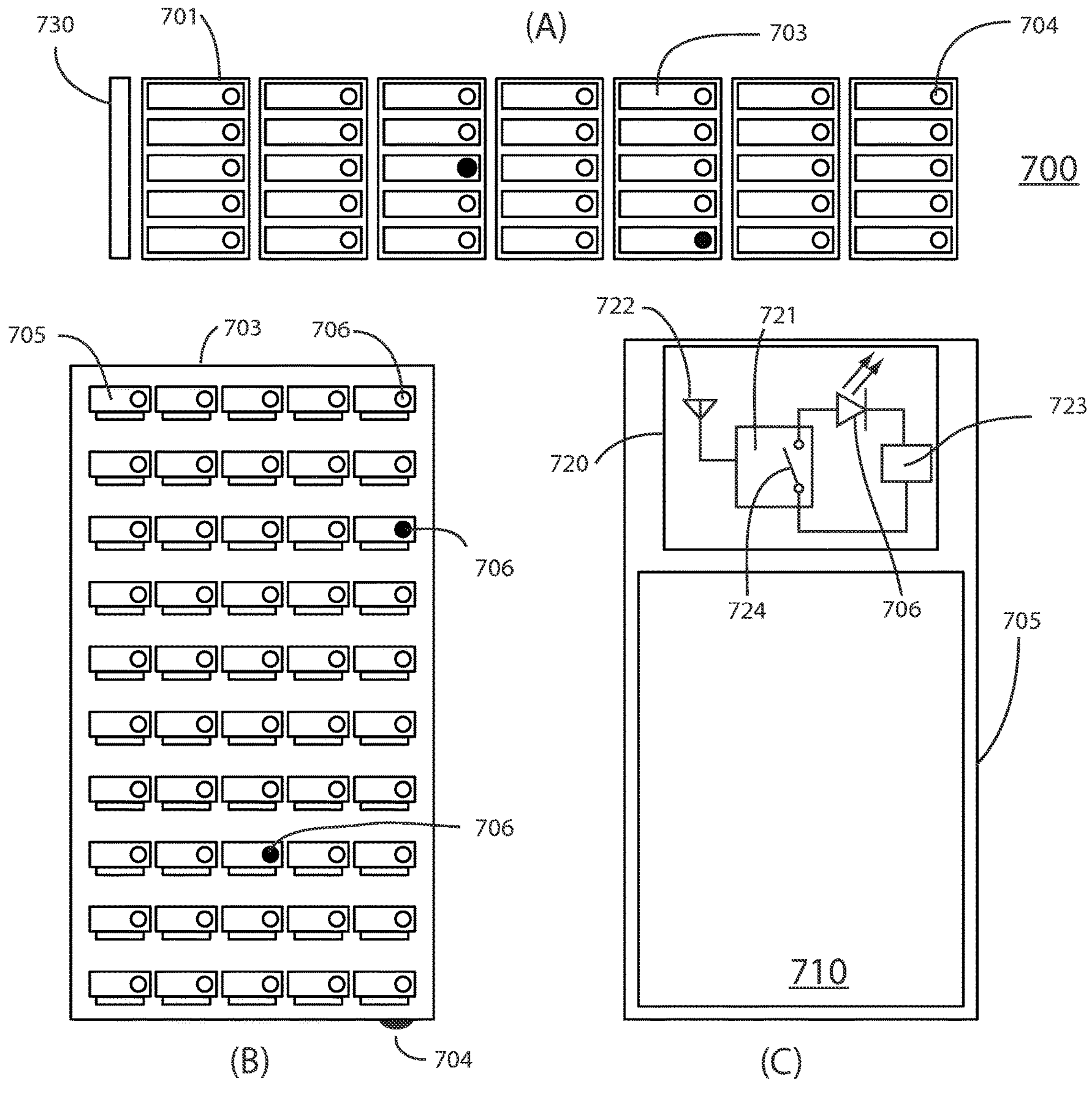
FIG. 7(A) shows a front view of a tissue block repository.
FIG. 7(B) shows a top view of one of the drawers of FIG. 7(A)
FIG. 7(C) shows a schematic block diagram of one of the tissue blocks of FIG. 7(B)

Assume, for example, that three different samples are to be retrieved from freezer 600: two samples located in the partially removed (i.e., first) box 607 in the partially removed (i.e., fourth) rack 605 behind the open (i.e., second) vapor door 603 depicted in FIG. 7 and the third sample located behind the bottom-most (i.e., fifth) vapor door 603 in freezer 600. Indicator patterns will also cue the user when the incorrect sample is removed. For example, all of the indicator lights might blink to indicate to the user that he removed a sample that was not supposed to be removed.

For an implementation involving simultaneous illumination of indicator lights, the computer would initially illuminate freezer indicator light 602. When the user opens the freezer's door, the computer would then illuminate the shelf indicator lights 604 for the second and fifth vapor doors 603. When the user opens the second vapor door 603, the computer would then illuminate the rack indicator light 606 for the fourth rack 605. When the user partially removes the fourth rack 605, the computer would then illuminate the box indicator light 608 for the first box 607. After the user removes the two desired samples from that first box 607 and replaces the box into the fourth rack 605, the computer would then turn off the indicator lights for the first box, the fourth rack, and the second vapor door, since no more samples need to be retrieved from the second shelf.

After returning the fourth rack into the second shelf and closing the second vapor door, the user would then proceed to open the fifth vapor door in order to remove the third desired sample from the fifth shelf with the computer first illuminating and then turning off the appropriate indicator lights in a similar manner as just described.

Note that the computer can determine that a sample has been retrieved from freezer 600 either by automatically detecting that the tagged vial has been removed from its box or by the user manually scanning the retrieved vial using an appropriate RFID scanning device configured to communicate with the computer.

For an implementation involving sequential illumination, the computer would illuminate the various indicator lights for only one sample at a time, but the computer would preferably organize the desired samples into an efficient sequence grouping nearby samples together, such that all samples in a given box would be retrieved before proceeding to another box, all samples in a given rack would be retrieved before proceeding to another rack, all samples in a given shelf would be retrieved before proceeding to another shelf, and lastly all samples in a given storage device would be retrieved before proceeding to another storage device. Thus, in the previous example, after guiding the user to retrieve the first desired sample from the first box in the fourth rack in the second shelf of freezer 600, the computer would illuminate appropriate indicator lights to guide the user to remove the second desired sample from that same box before proceeding to illuminate a different set of indicator lights to guide the user to retrieve the third desired sample from the fifth shelf.

Although freezer 600 has indicator lights at the freezer level, the shelf level, the rack level, and the box level, in alternative embodiments, a freezer might not have indicator lights at one or more of the lower levels.

Instead of or in addition to indicator lights, a user could be guided by a hand-held device that indicates to the user in some appropriate manner (e.g., visually or audibly) the identities of the storage device, shelf, rack, and box for the next sample to be retrieved.

The power for illuminating the indicator lights can be derived from the same power source used to power the various other sets of electronics located within the freezer. In the case of wireless power transmission, a rack could remain powered and its indicator lights illuminated even when the rack is partially removed. A box might have sufficient energy storage to light indicators for a period, e.g., 5 minutes, after removal from the system, along with a power indicator to show that the other box indicators are reliable.

FIG. 7(A) shows a front view of a tissue block repository 700 having (e.g., seven) cabinets 701, each containing (e.g., five) drawers 703. FIG. 7(B) shows a top view of one of the drawers 703 of FIG. 7(A) containing (e.g., 50) tissue blocks 705. FIG. 7(C) shows a schematic block diagram of one of the tissue blocks 705 of FIG. 7(B).

As represented in FIGS. 7(A) and 7(B), respectively, each drawer 703 has a corresponding (e.g., LED) drawer indicator light 704, and each tissue block 705 has a corresponding (e.g., LED) block indicator light 706.

As shown in FIG. 7(C), each tissue block 705 has a tissue sample 710 and an RFID circuit 720. RFID circuit 720 has an RFID chip 721, an antenna 722 of some appropriate form, a power source 723, and the corresponding block indicator light 706. Power source 723 can be a battery, a wirelessly and inductively coupled coil, or any other suitable power source that can illuminate block indicator light 706. RFID chip 721 has a controllable switch 724 that can be selectively closed or opened to turn on or off block indicator light 706. RFID chip 721 may be a 2GiL+RFID chip from NXP Semiconductors N.V. of Eindhoven, Netherlands, although other suitable chips could be used in alternative implementations.

Repository 700 also has one or more (e.g., distributed) RFID readers 730 that can read the RFID tag associated with each sample as well as communicate with (i) drawer-level electronics (not shown) to control each drawer indicator light 704 and (ii) each RFID chip 721 to control the corresponding block indicator light 706. The one or more RFID readers 730 are configured to communicate with an external computer (not shown), analogous to the external computer described previously in the context of FIG. 6.

Similar to the operations described for freezer 600, for repository 700, the computer would selectively illuminate (either simultaneously or sequentially) appropriate drawer and block indicator lights 704 and 706 to guide a user to retrieve one or more desired tissue samples from the repository. When a particular tissue sample 710 is to be retrieved, the computer would instruct an appropriate RFID reader 730 to communicate with the RFID chip 721 in the corresponding RFID circuit 720 via antenna 722 to instruct the RFID chip to close its switch 724 to illuminate the corresponding block indicator light 706. After the tissue sample has been removed, the computer would instruct the RFID reader to communicate with the RFID chip to instruct the RFID chip to open its switch to turn off the block indicator light.

Although repository 700 has indicator lights at the cabinet, drawer, and sample level, in alternative embodiments, a repository might not have indicator lights at one or more of the lower levels.

Although guided retrieval has been described in the context of biological samples, those skilled in the art will appreciate that guided retrieval can be implemented in other contexts as well, such for any collection of similar items that need to be identified individually.

Bobbin-Based RFID Tags

Figure 8:
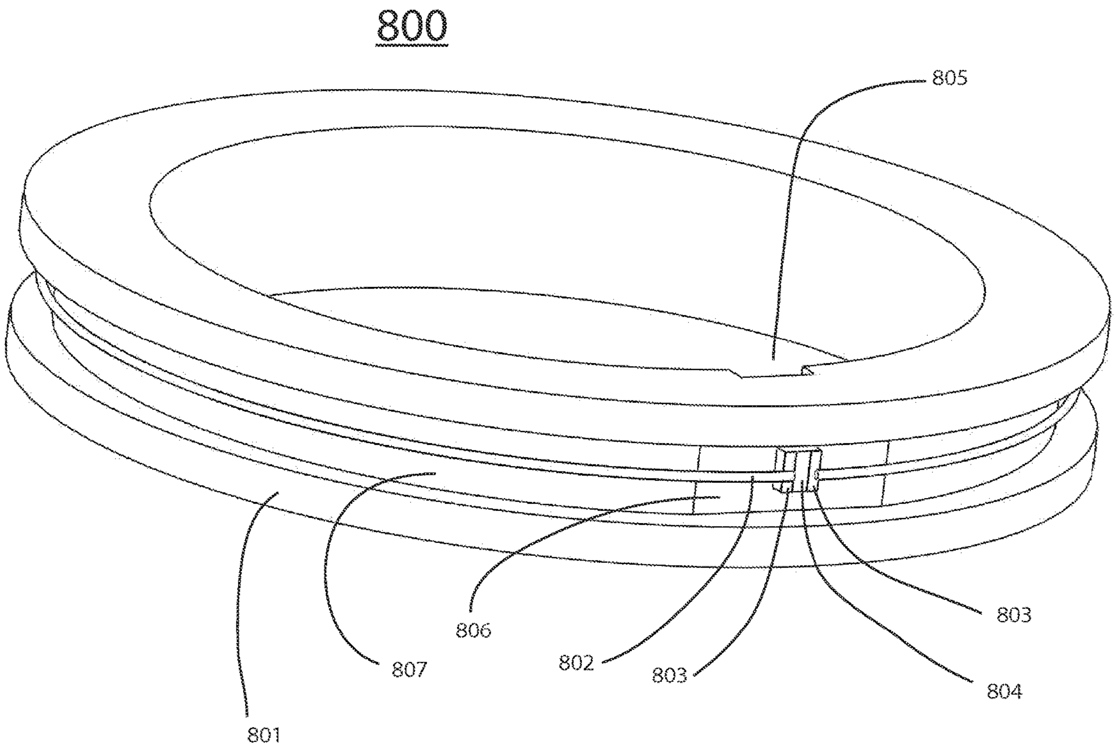
FIG. 8 shows an RFID tag formed using an annular bobbin.
Figure 9:
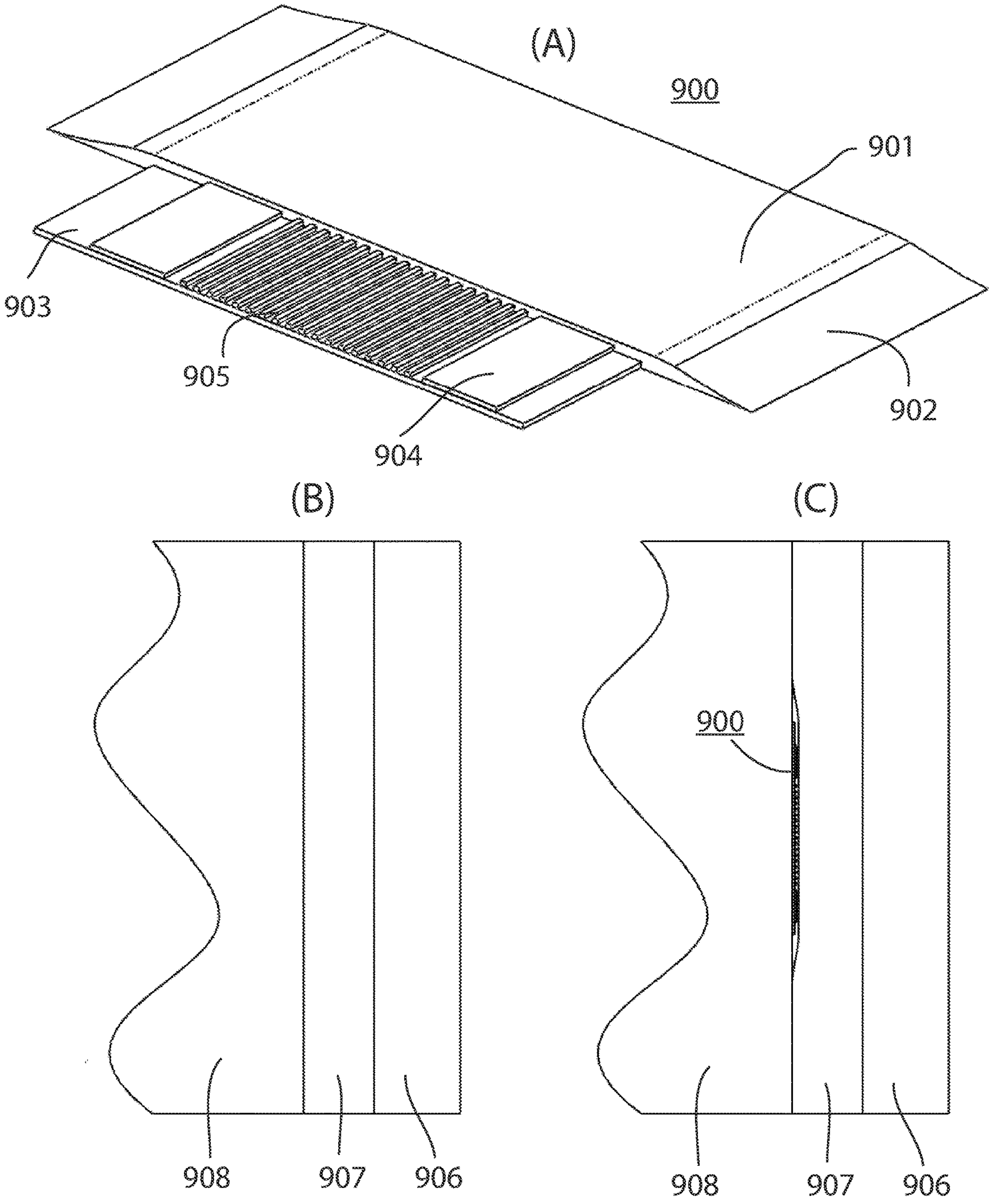
FIG. 9(A) shows a 3D perspective, partial cut-away view of a conduit that can be used to transfer electrical power and/or data signals between the outside world and the interior of a freezer.
FIG. 9(B) shows a cross-sectional view of the interface between the door and the body of a freezer.
FIG. 9(C) shows a cross-sectional view of the interface of FIG. 9(B) with conduit 900 installed between the freezer body and the gasket.

FIG. 8 shows an RFID tag 800 formed using an annular bobbin 801. In particular, bobbin 801 is made from a non-conducting (e.g., plastic, ceramic) material and has a groove 807 running around its circumference. Mounted (e.g., using a suitable silicon-die-compatible adhesive) onto a relatively flat portion 806 within the groove is an RFID chip 804. Connected at each end by wire-bonding to a different die contact 803 of the RFID chip is a wire 802 that runs around bobbin 801 within groove 807 to form and function as a loop antenna for the RFID tag. To protect the RFID tag, wire 802 and chip 804 can be encapsulated by filling groove 807 with a suitable encapsulant, such as a filled epoxy, having matching thermal-expansion characteristics.

Notch 805, angularly aligned with flat portion 806, can be included in the bobbin design to help position and orient the flat portion during tag assembly. In alternative embodiments, bobbin 801 may have additional flat portions, notches, grooves, and/or other suitable features to (a) help align the bobbin during tag assembly, (b) protect the wire, chip, and other components, and/or (c) mate the resulting RFID tag 800 to other structures (e.g., insertion of the tag into the recess of an untagged vial as in FIGS. 1 and 2).

FIG. 8 shows a single turn of wire, which can be used to function as a loop antenna for UHF (ultra high frequency) RFID tags. In alternative embodiments, insulated wire can be used to provide multiple wire turns within groove 807 to function as a loop antenna for lower frequency (e.g., HF) RFID tags. Alternatively, the turns might be positioned in space such that different turns of the wire do not touch each other. Once encapsulated, the same goal of multiple wire turns can be achieved without insulating the wire.

Wire 802 can be copper, aluminum, gold, or any suitable alloy used in wire bonding of integrated circuit chips. Furthermore, ball bonding or wedge bonding can be used if appropriate. For a strapped die, the wire would be attached by pressure or using a conductive adhesive.

Minimally Invasive Wiring Technique

FIG. 9(A) shows a 3D perspective, partial cut-away view of a conduit 900 that can be used to transfer electrical power and/or data signals between the outside world and the interior of a freezer, such as freezer 600 of FIG. 6. Conduit 900 comprises (e.g., metal) conductors 904 and 905 electrically isolated from one another and sandwiched between an insulating (e.g., rubber or plastic) substrate 903 and an insulating (e.g., rubber or plastic) cover 901. Depending on the application, conduit 900 can have one or more relatively wide conductors 904 (e.g., for power transfer) and one or more relatively thin conductors 905 (e.g., for data transfer). Conduit 900 preferably has tapered edges 902.

FIG. 9(B) shows a cross-sectional view of the interface between the door 906 and the body 908 of a freezer, like freezer 600, having an intervening, flexible (e.g., rubber) gasket 907 permanently attached to the freezer door and forming a seal between the freezer door and the freezer body when the door is closed.

FIG. 9(C) shows a cross-sectional view of the interface of FIG. 9(B) with conduit 900 installed between the freezer body 908 and gasket 907. In one implementation, conduit 900 is permanently mounted to the freezer body with the conduit's substrate 903 facing towards the freezer body and the conduit's cover 901 facing towards gasket 907. Substrate 903 may have an adhesive backing for mounting the conduit to the freezer body.

Note that conduit 900 can be used for any suitable application in which electrical signals need to be transferred between a first space having one environment (e.g., ambient room conditions) and a second space having a different environment (e.g., the interior of a freezer, a refrigerator, an oven, a clean room, or other similar apparatus or location).

When heat transfer through conduit 900 needs to be minimized, the thermal conductivity of conduit 900 can be reduced by designing conductors 904 and 905 to have an appropriate geometry. For example, conductors having a zig-zag shape provide a longer thermal conduction path and thereby reduce heat transfer as compared to straight conductors.

Using a metal having low thermal conductivity, such as stainless steel instead of copper, for the conductors can also reduce heat transfer. Copper-coated stainless steel can provide the desired characteristics for conduit 900 of low thermal conductivity and high electrical conductivity, especially at high frequencies where the skin effect is significant. Furthermore, optical fibers having low thermal conductivity can be used in place of metal conductors in conduit 900 for data transfer.

Cover 901 can have a metal layer to provide electromagnetic shielding for signals as well as mechanical protection that prevents chafing by the gasket.

Conduit 900 can also be used in situations in which there is no gasket. For example, in a liquid nitrogen dewar, such as dewar 400 of FIG. 4, a curved version of conduit 900 could be positioned within the interface between the loose-fitting lid 413 and the dewar body 401. Conduit 900 can also be used in situations in which there are two gaskets (e.g., one attached to the freezer door and the other attached to the freezer body), where the conduit is positioned between the two gaskets, e.g., permanently mounted to one of the two gaskets.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A storage system for storing biological samples, the system comprising:

a plurality of lowest-level containers, each lowest-level container configured to receive a plurality of biological samples in a corresponding plurality of storage locations;

two or more mid-level containers, each mid-level container configured to receive two or more lowest-level containers;

a highest-level container configured to receive the two or more mid-level containers, wherein:

the highest-level container is a storage device;

each mid-level container has a corresponding mid-level indicator device;

each lowest-level container has a corresponding lowest-level indicator device;

the storage system further comprises a controller sub-system that tracks the storage locations of biological samples stored in the storage system;

when a desired biological sample is to be retrieved from the storage system, the controller sub-system activates:

(a) the mid-level indicator device corresponding to the mid-level container containing the desired biological sample; and (b) the lowest-level indicator device corresponding to the lowest-level container containing the desired biological sample;

each stored biological sample is contained in a unique RFID-tagged vial;

the controller sub-system is configured to detect when a biological sample is removed from its corresponding lowest-level container based on the unique RFID for the biological sample; and the controller sub-system is configured to activate one or more of the indicator devices in a special manner that indicates when an incorrect biological sample has been retrieved from the storage system.

2. The invention of claim 1, wherein:

the controller sub-system does not activate the lowest-level indicator device corresponding to the lowest-level container containing the desired sample until after the mid-level container containing the desired sample is accessed.

3. The invention of claim 1, wherein, when a plurality of desired samples are to be retrieved from the storage system, the controller sub-system activates:

(a) the mid-level indicator device corresponding to each mid-level container containing at least one of the plurality of desired samples; and (b) the lowest-level indicator device corresponding to each lowest-level container containing at least one of the plurality of desired samples.

4. The invention of claim 3, wherein the controller sub-system is configured to de-activate:

(a) a corresponding lowest-level indicator device after a last desired sample has been retrieved from each lowest-level container; and (b) a corresponding mid-level indicator device after a last desired sample has been retrieved from each mid-level container.

5. The invention of claim 3, wherein, when first and second desired samples to be retrieved are stored in first and second mid-level containers, then the controller sub-system activates sequentially the two corresponding mid-level indicator devices for the first and second desired samples, with both (i) the mid-level indicator device for the second desired sample being activated and (ii) the mid-level indicator device for the first desired sample being de-activated, after retrieval of the first desired sample.

6. The invention of claim 3, wherein, when first and second desired samples to be retrieved are stored in the same mid-level container, but in first and second lowest-level containers, then the controller sub-system activates sequentially the two corresponding lowest-level indicator devices for the first and second desired samples, with both (i) the lowest-level indicator device for the second desired sample being activated and (ii) the lowest-level indicator device for the first desired sample being de-activated, after retrieval of the first desired sample.

7. The invention of claim 1, wherein:

each storage location has a corresponding storage-level indicator device;

when the desired sample is to be retrieved from the storage system, the controller sub-system further activates:

(c) the storage-level indicator device corresponding to the storage location containing the desired sample.

8. The invention of claim 7, wherein:

the controller sub-system does not activate the storage-level indicator device corresponding to the storage location containing the desired sample until after the lowest-level container containing the desired sample is accessed.

9. The invention of claim 7, wherein, when a plurality of desired samples are to be retrieved from the storage system, the controller sub-system activates the storage-level indicator device corresponding to each storage location containing one of the plurality of desired samples.

10. The invention of claim 9, wherein, when first and second desired samples to be retrieved are stored in the same mid-level container and the same lowest-level container, but in first and second storage locations, then the controller sub-system activates sequentially the two corresponding storage-location indicator devices for the first and second desired samples, with both (i) the storage-location indicator device for the second desired sample being activated and (ii) the storage-location indicator device for the first desired sample being de-activated, after retrieval of the first desired sample.

11. The invention of claim 1, wherein the storage system comprises a plurality of different mid levels, including:

a first mid level having plurality of first-mid-level containers, each first-mid-level container configured to receive two or more lowest-level containers and having a corresponding first-mid-level indicator device configured to be activated by the controller sub-system; and a second mid level having a plurality of second-mid-level containers, each second-mid-level container configured to receive two or more first-mid-level containers and having a corresponding second-mid-level indicator device configured to be activated by the controller sub-system.

12. The invention of claim 1, wherein each indicator device is a light-emitting diode.

13. The invention of claim 1, wherein:

the highest-level container is a cold-storage device; and each sample is a frozen biological sample.

14. The invention of claim 13, wherein:

the highest-level container is a mechanical freezer configured to receive a plurality of racks;

each rack has a corresponding rack indicator device and is configured to receive a plurality of shelves;

each shelf has a corresponding shelf indicator device and is configured to receive a plurality of boxes; and each box has a corresponding box indicator device and is configured to receive one or more unique RFID-tagged vials, each vial containing a frozen biological sample.

15. The invention of claim 1, wherein:

the highest-level container is a room-temperature storage device; and each sample is a room-temperature biological sample.

16. The invention of claim 15, wherein:

the highest-level container is a tissue block repository configured to receive a plurality of drawers;

each drawer has a corresponding drawer indicator device and is configured to receive a plurality of tissue boxes; and each tissue box has a corresponding tissue-box indicator device and in configured to receive one or more unique RFID-tagged vials, each vial containing a room-temperature biological sample.

17. The invention of claim 1, wherein the controller sub-system is configured to de-activate one or more corresponding indicator devices after the desired sample has been retrieved from the storage system.

18. The invention of claim 1, wherein, when a plurality of desired samples are to be retrieved from the storage system, the controller sub-system:

(i) guides retrieval of all desired samples in the same lowest-level container before guiding retrieval of any desired sample in another lowest-level container; and (ii) guides retrieval of all desired samples in the same mid-level container before guiding retrieval of any desired sample in another mid-level container.

19. The invention of claim 1, wherein the storage system further comprises a scanner configured to determine identity of a sample that has been removed from the lowest-level container.

20. A controller sub-system for a storage system for storing biological samples, the storage system comprising:

a plurality of lowest-level containers, each lowest-level container configured to receive a plurality of biological samples in a corresponding plurality of storage locations;

two or more mid-level containers, each mid-level container configured to receive two or more lowest-level containers;

a highest-level container configured to receive the two or more mid-level containers, wherein:

the highest-level container is a storage device;

each mid-level container has a corresponding mid-level indicator device;

each lowest-level container has a corresponding lowest-level indicator device;

the controller sub-system is configured to track the storage locations of biological samples stored in the storage system;

when a desired biological sample is to be retrieved from the storage system, the controller sub-system activates:

(a) the mid-level indicator device corresponding to the mid-level container containing the desired biological sample; and (b) the lowest-level indicator device corresponding to the lowest-level container containing the desired biological sample;

each stored biological sample is contained in a unique RFID-tagged vial;

the controller sub-system is configured to detect when a biological sample is removed from its corresponding lowest-level container based on the unique RFID for the biological sample; and the controller sub-system is configured to activate one or more of the indicator devices in a special manner that indicates when an incorrect biological sample has been retrieved from the storage system.

* * * * *